United States Patent
Lanzl et al.

(10) Patent No.: US 9,956,712 B2
(45) Date of Patent: May 1, 2018

(54) METHOD FOR PRODUCING A PRESSURE ACCUMULATOR, AND PRESSURE ACCUMULATOR

(71) Applicant: Rehau AG + Co, Rehau (DE)

(72) Inventors: Thomas Lanzl, Marktredwitz (DE); Franz Hofmann, Münchberg (DE); Markus Friederich, Bergtheim (DE); Marina Feist, Hof (DE); Andreas Gruhl, Dresden (DE)

(73) Assignee: REHAU AG+CO, Rehau (DE)

( * ) Notice: Subject to any disclaimer, the term of this patent is extended or adjusted under 35 U.S.C. 154(b) by 0 days. days.

(21) Appl. No.: 15/039,421

(22) PCT Filed: Nov. 5, 2014

(86) PCT No.: PCT/EP2014/002958
§ 371 (c)(1),
(2) Date: May 26, 2016

(87) PCT Pub. No.: WO2015/078555
PCT Pub. Date: Jun. 4, 2015

(65) Prior Publication Data
US 2017/0165894 A1 Jun. 15, 2017

(30) Foreign Application Priority Data
Nov. 29, 2013 (DE) .................... 10 2013 113 208

(51) Int. Cl.
*B29C 70/32* (2006.01)
*F17C 1/06* (2006.01)
*B29C 49/04* (2006.01)
*B29C 70/44* (2006.01)
*B29L 31/00* (2006.01)

(52) U.S. Cl.
CPC .............. *B29C 49/04* (2013.01); *B29C 70/32* (2013.01); *B29C 70/443* (2013.01); *B29C 70/446* (2013.01); *F17C 1/06* (2013.01); *B29L 2031/7156* (2013.01); *F17C 2221/012* (2013.01)

(58) Field of Classification Search
CPC ..................... F17C 1/06; F17C 1/16
See application file for complete search history.

(56) References Cited

U.S. PATENT DOCUMENTS

| 3,331,722 A * | 7/1967 | Ponemon | B29C 53/605 |
| | | | 140/124 |
| 2006/0096993 A1* | 5/2006 | Takashima | F17C 1/06 |
| | | | 220/588 |
| 2010/0258573 A1* | 10/2010 | Weber | F17C 1/06 |
| | | | 220/586 |
| 2011/0220659 A1* | 9/2011 | Strack | F17C 1/16 |
| | | | 220/586 |

FOREIGN PATENT DOCUMENTS

JP 2004-263827 9/2004

OTHER PUBLICATIONS

International Search Report, International patent application No. PCT/EP2014/002958, dated Jan. 27, 2015.

* cited by examiner

*Primary Examiner* — Jeffry H Aftergut
(74) *Attorney, Agent, or Firm* — Da Vinci Partners LLC; John Moetteli

(57) ABSTRACT

The invention relates to a method for producing a pressure accumulator (1), in particular for storing hydrogen in motor vehicles. First, a pressure accumulator liner (3) which has at least one pole cap (2, 2') is produced preferably by means of a plastic blow molding method, and the outside of the liner (3) is then provided, preferably braided, with a multi-ply reinforcing layer (9), which has reinforcing fibers (8). According to the invention, a fiber supply cap (10, 10') is applied on the pole cap (2, 2') prior to applying the reinforcing fibers (8), the outer surface of the fiber supply cap being spaced from the pole region (21, 21') of the pole cap (2, 2'). The reinforcing fibers (8) are applied onto the body of the liner (3) and in the pole region (21, 21') so as to correspond to the outer surface of the fiber supply cap (10, 10') while the reinforcing layer (9) is applied such that the inner reinforcing layer (9) plies which are formed by the reinforcing fibers (8) are provided with a fiber supply (22) in the pole region (21, 21') on the basis of the distance between the outer surface of the fiber supply cap (10, 10') and the pole region (21, 21') of the pole cap (2, 2'). The invention also relates to a pressure accumulator (1) produced in a corresponding manner.

8 Claims, 4 Drawing Sheets

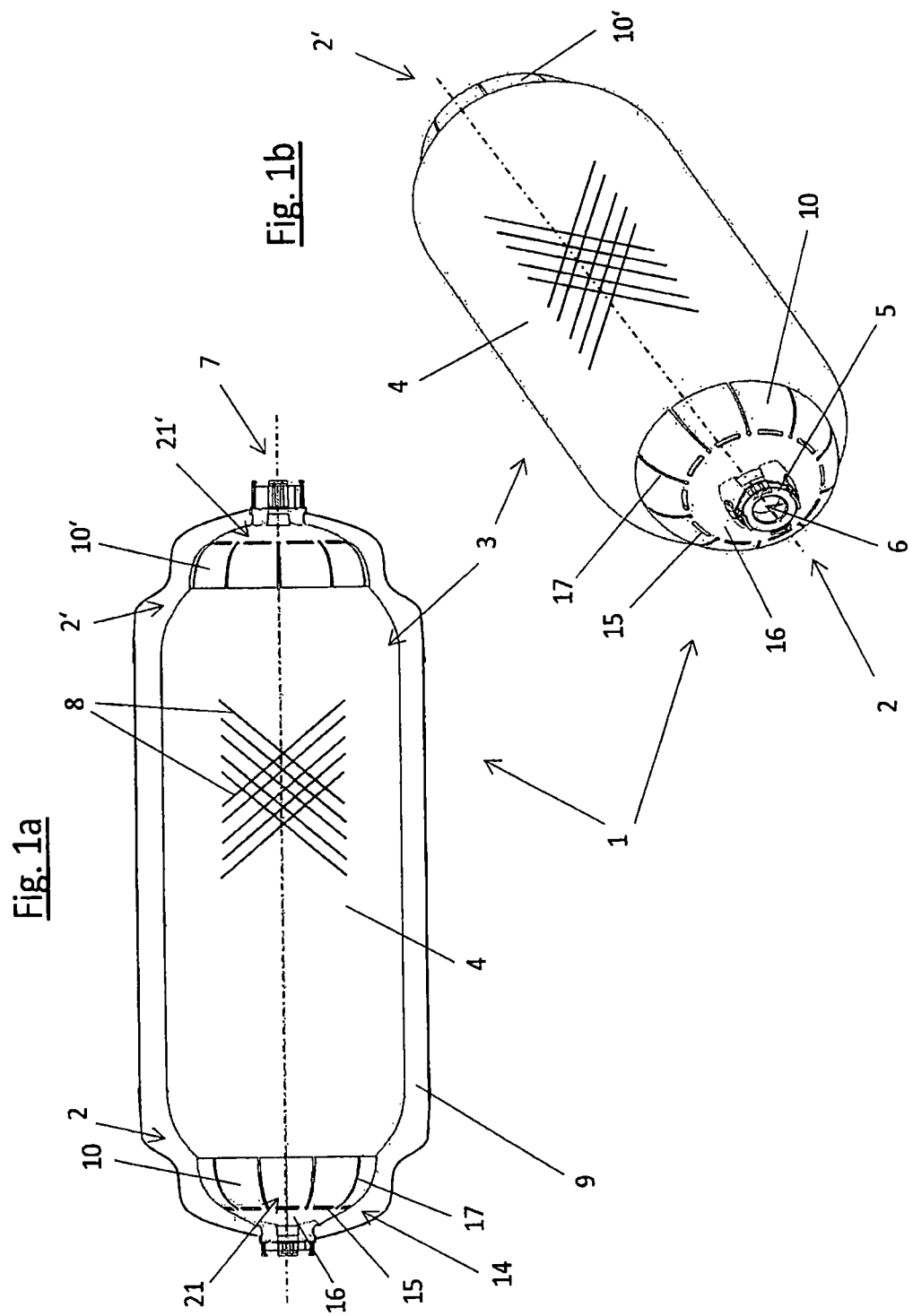

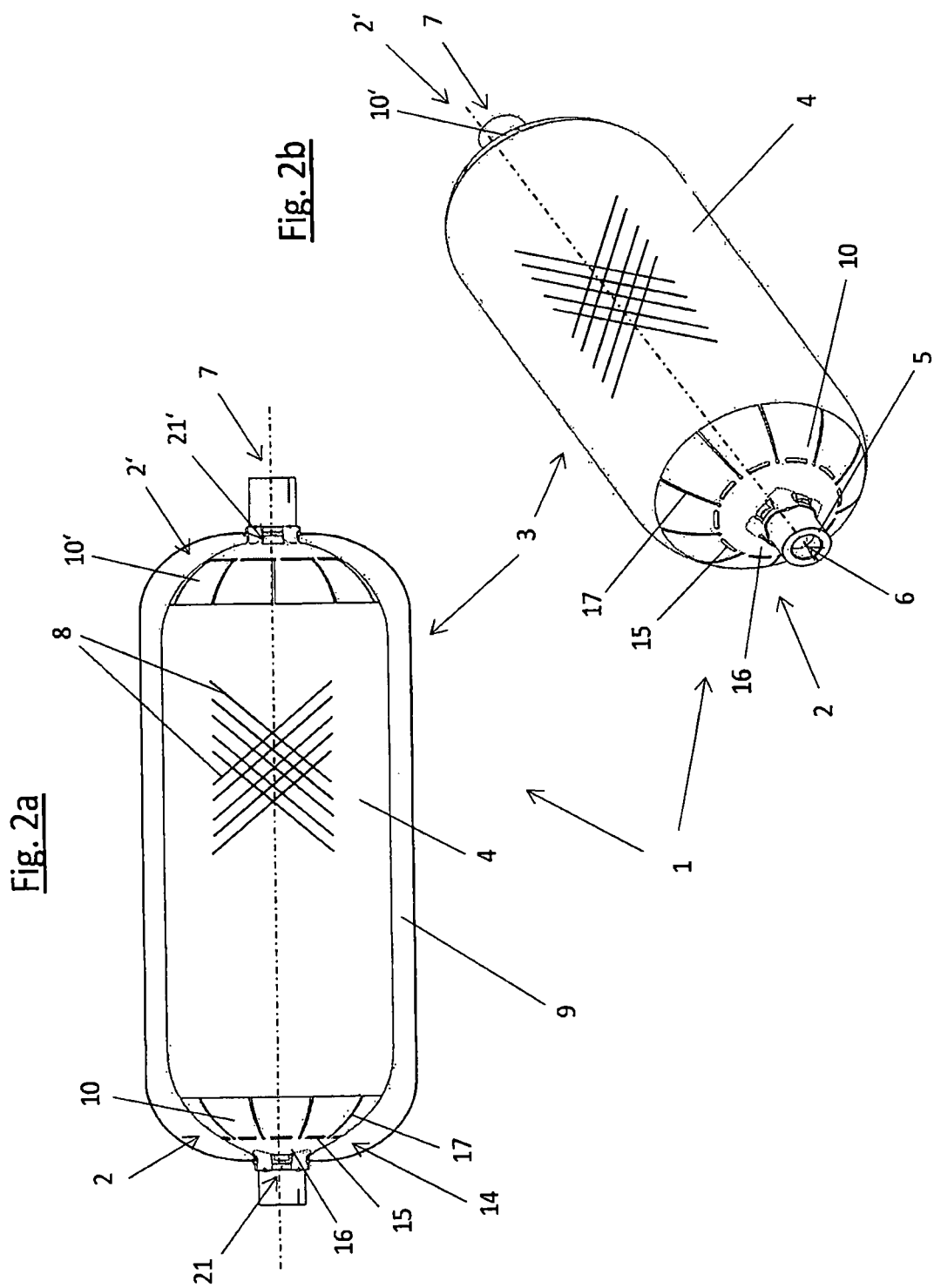

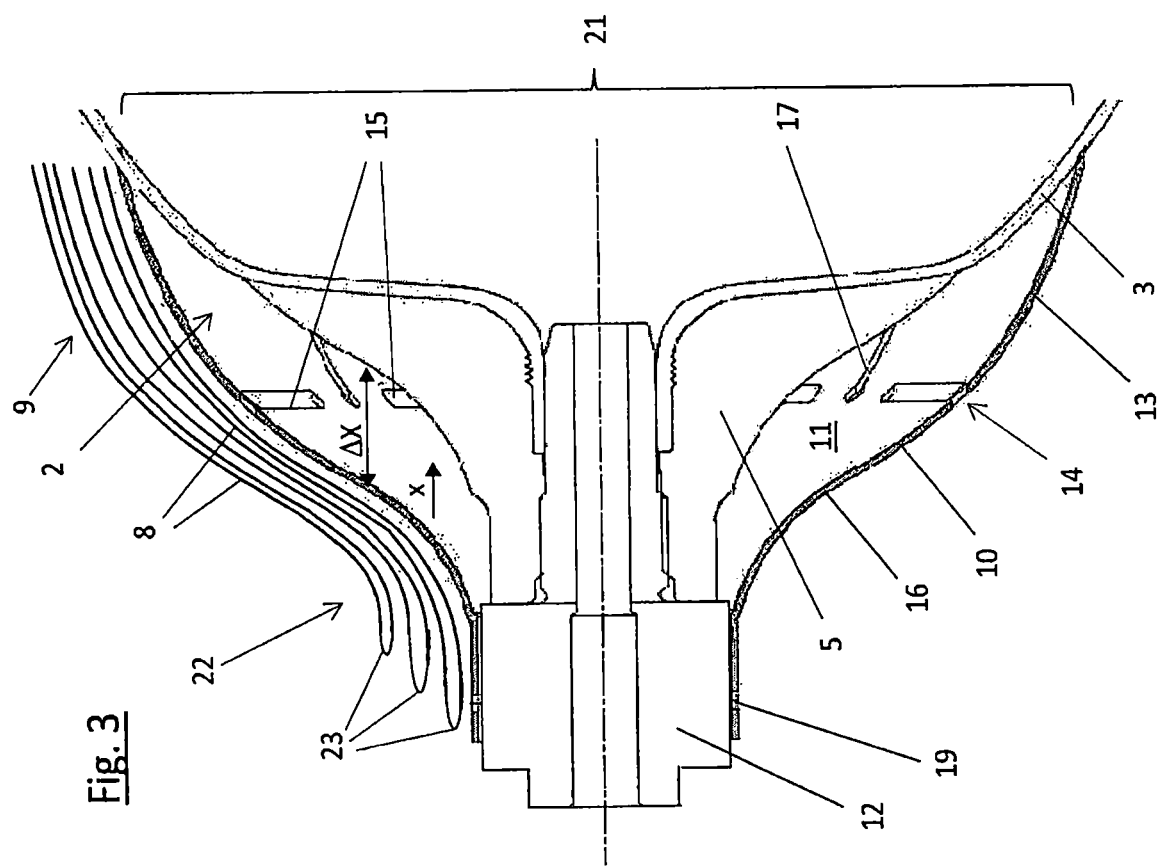

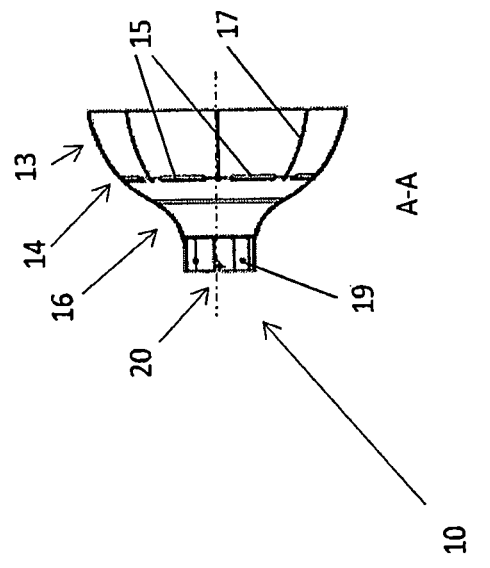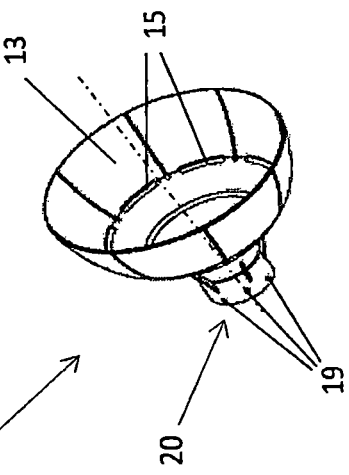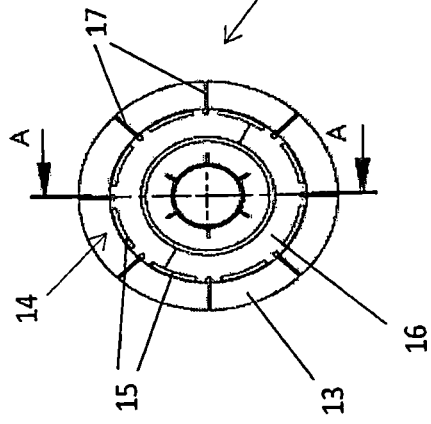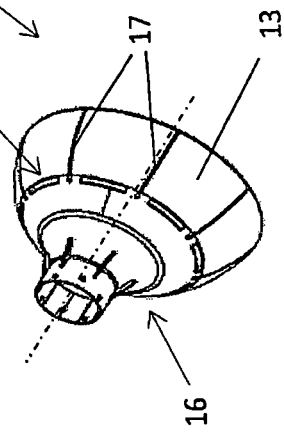

METHOD FOR PRODUCING A PRESSURE ACCUMULATOR, AND PRESSURE ACCUMULATOR

CROSS REFERENCE TO RELATED APPLICATIONS

This application is the National Stage of International Application No. PCT/EP2014/002958, filed Nov. 5, 2014, which claims benefit under 35 USC § 119(a), to German patent application Ser. No. 10 2013 113 208.1, filed Nov. 29, 2013.

The invention relates to a method for producing a pressure accumulator, in particular for storing hydrogen in motor vehicles, in which first, preferably by means of a plastic blow-molding process, a liner of the pressure accumulator is produced, which has at least one pole cap, and then the outside of the liner is provided with a multilayered reinforcing layer preferably produced by means of braiding.

A method of this kind is known, for example, from WO 2010/145795 A2. Pressure accumulators for storing hydrogen in motor vehicles must, on the one hand, have the largest possible storage volume for a predetermined overall size and, on the other hand, must have a low weight in order to ensure lower fuel consumption. Naturally, it must also be possible to manufacture such pressure accumulators at a competitive cost.

Compared with hydrogen pressure accumulators, e.g. composed of metal, pressure accumulators with a liner made of plastic allow for lower weight. But in order to be able to withstand high pressure, usually approximately 700 bar, when storing a large amount of hydrogen, such plastic liners must usually be provided with a reinforcing layer. This layer is mounted on the liner for example by means of a braiding or winding process. One goal in the manufacture of the reinforcing layer is to exert as uniform a load as possible on the individual reinforcing fibers of the reinforcing layer during operation, which fibers may be embodied in the form of carbon and/or glass fibers, for example. This ensures that the mechanical loading capacity of the reinforcing fibers is used to the fullest extent possible. As a result, with the most uniform possible load on the reinforcing fibers, a smaller overall thickness of the reinforcing layer can be achieved than with a non-uniform load on the fibers. On the one hand, this results in a cost savings, which is particularly apparent when using comparatively expensive carbon fibers. On the other hand, with a thinner reinforcing layer and a predetermined overall size, it is also possible to achieve a greater usable storage volume for the hydrogen.

If a plastic liner is provided with a reinforcing layer composed of reinforcing fibers, the problem frequently arises that with a normal operating pressure of several hundred bar acting on the liner, the reinforcing fibers of the inner plies of the reinforcing layer are subjected to a significantly higher mechanical load than the outer plies. This is particularly the case if the reinforcing layer is impregnated with a resin during production of the pressure accumulator and after the resin hardens, this constitutes a high-strength composite together with the resin. If a production-dictated, non-uniform fiber load occurs during the hardening phase, then after the resin hardens, this is permanently retained and reduces the mechanical loading capacity of the pressure accumulator or requires the design of a thicker reinforcing layer.

In light of these circumstances, the object of the invention is to disclose a method with the aforementioned features, which permits the thinnest possible thickness of the reinforcing layer with a predetermined internal pressure of the pressure accumulator during operation.

The object is attained according to the invention by virtue of the fact that before the reinforcing fibers are applied, a fiber supply cap is applied to the pole cap whose outer surface is spaced apart from the pole region of the pole cap; during the application of the reinforcing layer, the reinforcing fibers that are placed onto the body of the liner and in the pole region, are correspondingly placed onto the outer surface of the fiber supply cap so that because of the distance between the outer surface of the fiber supply cap and the pole region of the pole cap, the inner plies of the reinforcing layer composed of the reinforcing fibers are provided with a fiber supply in the pole region. According to the invention, therefore, by means of the above-described method, in the region of the inner plies of the reinforcing layer embodied in the form of a fiber supply, more fiber material is applied than would actually be necessary based on the geometry of the liner, which generally has a cylindrical middle section. The amount of this fiber supply is determined by the axial spacing of the outer surface of the fiber supply cap from the pole region of the pole cap, which results in an elongated braiding distance for the corresponding reinforcing layers. Then, according to the invention, this fiber supply is used, as demonstrated extensively below, to finally ensure the most uniform possible mechanical loading of the reinforcing fibers across the entire thickness of the reinforcing layer during operation of the pressure accumulator.

Advantageously, the fiber supply cap and the pole cap together form a cavity during the application of the reinforcing layer. The axial length of this cavity decisively determines the size of the fiber supply since it predetermines the additional braiding path that must be braided when applying the inner plies of the reinforcing layer in comparison to a braiding directly around the pole cap. During the application of the reinforcing layer, the fiber supply cap is advantageously immobilized by an immobilizing device, which ensures the spacing of the fiber supply cap from the pole region during this process step. This ensures that during the braiding, no premature, unwanted convergence occurs between the fiber supply cap and the pole region, which would result in a reduction of the fiber supply.

In order to now obtain a very compact reinforcing layer, which, with the predetermined outer dimensions of the pressure accumulator, makes it possible to achieve a large usable storage volume, the following method is used: preferably after the application of the reinforcing layer, the liner is inserted into a tool surrounding the reinforcing layer and is acted upon with an internal positive pressure so that due to the action of the pressure, the pressure accumulator rests against the inner surface of the tool. The immobilizing device is advantageously released after the application of the reinforcing layer and because of the internal positive pressure in the liner, the fiber supply cap is slid into the pole region and the fiber supply is thus uncovered. This occurrence is essentially based on two effects. Because of the internal positive pressure, the reinforcing layer is expanded radially and as a compensation for this, contracts axially. This effect is seen across the radius of the reinforcing layer, but to different degrees. On the one hand, the inner plies of the reinforcing layer extend along a smaller radius than the outer ones so that in the inner plies, there is less fiber material available for expansion than in the outer ones. On the other hand, however, with the desired radial compression of the reinforcing layer, the inner plies must, at the same time, be expanded significantly more than the outer ones because the radial expansion of the outer plies is restricted by the rigid inner surface of the tool. On the whole, this results in the fact that, for the inner plies, a significantly larger fiber supply is required than for the outer plies of the reinforcing layer. This situation is taken into account by means of a corresponding geometric embodiment of the fiber supply cap. After this, the reinforcing layer is advantageously impregnated with a resin, preferably an epoxy resin, which after it hardens, freezes the reinforcing layer in the expanded state caused by the internal positive pressure in the liner. The resin can be introduced into the reinforcing layer by means of an infiltration (negative pressure method) or alternatively with the aid of an injection (positive pressure method). After the resin has hardened completely, the liner is released and the pressure accumulator is removed from the tool. The hardened resin ensures that the reinforcing layer remains in its radially compressed form, which it has assumed due to the action on the liner with the internal positive pressure, i.e. is "frozen." The reinforcing layer is thus permanently compressed and with the predetermined outer dimensions of the pressure accumulator, permits the use of a large free container volume.

Advantageously, the reinforcing fibers in at least some areas, preferably in the inner plies of the reinforcing layer, are braided around the liner with an angle that is reduced in relation to the neutral angle of approximately 54°, e.g. 46-52°, in particular 48-50°. The reinforcing layer is thus tends to come closer to this neutral angle and for this reason, contracts axially when an internal pressure is exerted on the liner, which pushes the fiber supply caps against the pole caps.

Through the above-described release of the fiber supply, in the unloaded state of the pressure accumulator, the reinforcing fibers in the inner plies of the reinforcing layer are under a lower prestressing force than without the use of the method according to the invention. As a result, the mechanical load on these plies during operation is reduced and, on the whole, a thinner reinforcing layer can be constructed, which permits an increase in the usable container volume and at the same time, achieves savings on expensive reinforcing material. As has been explained above, after the immobilizing device is released, because of the tensile stress in the reinforcing fibers, the fiber supply cap rests in a pressure-exerting fashion against the pole cap. In the context of the invention, it is particularly important here that in at least some regions, the fiber supply cap is adapted to the outer contour of the pole cap. This ensures that the fiber supply cap cannot shift relative to the pole cap during operation of the pressure accumulator. Advantageously, the fiber supply cap is elastically deformed as it adapts to the outer contour of the pole cap and thus permanently remains in this elastically deformed state in the pressure accumulator.

Advantageously, the individual plies of the reinforcing layer are applied in such a way that the reversal points produced on the fiber supply cap at the transition between the individual plies are shifted axially toward the liner with increasing layer thickness. This is particularly related to the above-described decrease in the need for a fiber supply toward the outside. On the whole, this results in an optimum embodiment of the overall braiding structure, which ensures the most uniform possible load on all of the reinforcing fibers. Advantageously, after or possibly even before the uncovering of the fiber supply, the reinforcing layer composed of a multitude of fibers is impregnated with a resin, e.g. by being injected or infiltrated with the resin, and after the uncovering of the fiber supply, is hardened in order to fill the open spaces between the fibers and by means of this, to further increase the strength of the reinforcing layer. Preferably, the reinforcing layer is compacted from the outside during the infiltration or is also compacted from the inside through the exertion of an internal positive pressure on the liner in order, during this processing step, to reduce the volume of the open spaces and thus to obtain the lowest possible thickness of the reinforcing layer after the hardening of the resin. It is thus possible, for example, to act on the liner during the resin infiltration or resin injection with an internal positive pressure of 2-130 bar, preferably 2-50 bar. In this state of the pressure accumulator, the reinforcing layer, which has been compacted radially by the internal positive pressure, is impregnated with the resin, which hardens as the internal positive pressure is continuously maintained. In this way, the reinforcing layer is "frozen" in this radially compressed state so that even after the load on the liner is released, the high fiber density in the reinforcing layer is retained. For example, an epoxy resin can be used for the resin.

Another subject of the invention is a pressure accumulator according to claim 8. Preferred embodiments of this pressure accumulator are described in the dependent claims 9 through 16.

The invention will be described below in conjunction with the drawings, which show only a single exemplary embodiment. In the drawings:

FIGS. 1a & 1b: schematically depict a respective side view and three-dimensional view of a pressure accumulator according to the invention during the manufacturing process;

FIGS. 2a & 2b: schematically depict the pressure accumulator shown in FIGS. 1a & 1b in the completely manufactured state, FIG. 3: is a schematic, cross-sectional depiction of a detail of the pressure accumulator shown in FIGS. 1a-2b during the manufacturing process, and FIGS. 4a-4d: schematically depict the fiber supply cap shown in FIG. 3 in different individual views.

FIGS. a, 1b, 2a, and 2b show a pressure accumulator 1 for storing hydrogen in a motor vehicle. The pressure accumulator 1 has a liner 3 made of plastic, with two pole caps 2, 2' and a cylindrical middle section 4. The two pole caps 2, 2' are formed onto this middle section 4. For filling and dispensing hydrogen, the pole cap 2 of the pressure accumulator 1 also has a fitting 5—also referred to as a boss—with an opening 6. The pole cap 2' provided at the opposite end of the pressure accumulator 1 also has a so-called blind boss 7, which is only used for mounting the pressure accumulator 1 in the vehicle. A braided multilayered reinforcing layer 9 containing reinforcing fibers 8 is applied to the outside of the liner 3. In the exemplary embodiment, the reinforcing fibers 8 are embodied in the form of carbon fibers and in FIGS. 1a-2b, only a few of them are individually indicated in order to improve visibility. Likewise, for the sake of better comprehension of the drawings, the reinforcing layer 9 is only schematically depicted in FIGS. 1a and 2a. FIGS. 1a and 2a clearly show that between the pole caps 2, 2' and the reinforcing layer 9, a respective fiber supply cap 10, 10' is provided, which, during the application of the reinforcing fibers 8 onto the liner 3, ensures a fiber supply 22 (see FIG. 3) for the inner plies of the reinforcing layer 9. FIG. 3 shows that during the application of the reinforcing layer 9, the fiber supply cap 10 and the pole cap 2 together form a cavity 11 and the fiber supply cap 10 is immobilized in a corresponding position by an immobilizing device 12. The fiber supply cap 10' and the pole cap 2' are positioned in an analogous fashion relative to each other. The fiber supply caps 10, 10' are each embodied as thin-walled, with an average wall thickness of less than 5 mm and are made of plastic. In particular, FIGS. 2a and 2b show that in the complete, finished state of the pressure accumulator 1, the shape of the fiber supply caps 10, 10' is adapted to the outer contour of the pole caps 2, 2', To this end, the fiber supply caps 10, 10' are elastically deformable in the outer region 13, which enables adaptation to the outer contour of the pole caps 2, 2'. This is particularly evident from a comparison of FIGS. 1a and 2a.

FIGS. 4a through 4d show different views of the fiber supply cap 10 shown as an individual part in FIG. 3. FIG. 4a shows a plan view from above, FIG. 4b shows the section A-A indicated in FIG. 4a, and FIGS. 4c and 4d show a three-dimensional, oblique view from above and below. The fiber supply cap 10 has a circumferential material relief 14, which, because it is weaker, functions as a hinge joint for the outer region 13 of the fiber supply cap 10 during the adaptation of this cap 10 to the outer contour of the pole cap 2. In an exemplary embodiment, the material relief 14 is composed of a plurality of circumferential slits 5. The circumferential slits 15 are distributed uniformly over the circumference. They pass all the way through the material of the fiber supply cap 10. As described above, the outer region 13 is elastic so that it can take on the corresponding contour of the pole cap 2 in this region. In its inner region 16 close to the axis, by contrast, the fiber supply cap 10 is rigid so that it can be rigidly connected to the immobilizing device 12. The geometry of the rigid inner region 16 of the fiber supply cap 10 is adapted to the contour of the pole cap 2 close to the axis—which in the exemplary embodiment is composed of the contour of the boss 5. In its outer region 13, the fiber supply cap 10 also has material reliefs 17 extending toward the outer edge which serve to facilitate the adaptation to the outer contour of the pole cap 2 in this region 13. In an exemplary embodiment, these material reliefs 17 are each embodied in the form of a longitudinal slit. The longitudinal slits 17 are distributed uniformly around the circumference. As the fiber supply cap 10 adapts to the geometry of the pole cap 2, the longitudinal slits 17 are expanded (see FIGS. 2a & 2b). The longitudinal slits 17 also pass all the way through the material of the fiber supply cap 10. In its inner region 16 close to the axis, the fiber supply cap 10 also has a plurality of affixing openings 19, which together form a connecting device 20 for connecting the fiber supply cap 10 to the immobilizing device 12.

The method according to the invention for manufacturing the pressure accumulator 1 will be explained below in conjunction with FIG. 3. First, a plastic blow molding process is used to produce the liner 3 of the pressure accumulator 1, which is composed of a cylindrical middle section 4 with pole caps 2, 2' at the ends. The pole caps 2, 2' also include a boss 5 and a blind boss 7, which are preferably each composed of metal and are installed after the blow molding process. Then the multilayered reinforcing layer 9 with the reinforcing fibers 8 is braided into the outside of the liner 3 (for the sake of simplicity of illustration, FIG. 3 shows only the innermost plies of the reinforcing layer 9). Before the reinforcing fibers 8 are applied, a fiber supply cap 10, 10' is applied to both of the pole caps 2, 2', whose outer surface is spaced apart from the pole region 21, 21' of the corresponding pole cap 2, 2'. During the application of the reinforcing layer 9, the reinforcing fibers 8 are applied to the body of the liner 3 and in the pole regions 21, 21', are correspondingly applied to the outer surface of the fiber supply caps 2, 2'. Because of the distance between the outer surface of the fiber supply caps 10, 10' and the pole region 21, 21' of the pole caps 2, 2', the inner plies of the reinforcing layer 9 composed of the reinforcing fibers 8 are provided with a fiber supply 22 in the pole regions 21, 21'.

FIG. 3 shows that during the application of the reinforcing layer 9, the fiber supply cap 10 and the pole cap 2 together with the boss 5 form a cavity 11. During the application of the reinforcing layer 9, the fiber supply cap 10 is immobilized by an immobilizing device 12, which ensures the spacing of the fiber supply cap 10 from the pole region 21 during this process step.

After the entire reinforcing layer 9 has been applied, the pressure accumulator 1 is inserted into an infiltration or injection tool, not shown, which completely encompasses the reinforcing layer 9 and which is adapted to the outer contour of the reinforcing layer 9, the immobilizing device 12 is detached, and the liner 3 is acted on with an internal positive pressure. In this case, the reinforcing layer 9 rests against the inner surface of the tool due to the action of the pressure. Because of the tensile stress of the applied reinforcing fibers 8, the fiber supply cap 10 shifts relative to the pole region 21 in the direction of the arrow x, thus uncovering the fiber supply 22.

When the fiber supply 22 is uncovered, the fiber supply caps 10, 10' adapt to the outer contour of the pole caps 2, 2'—which is partially composed of the boss 5 and blind boss 7, respectively (also see FIGS. 2a & 2b). To this end—as explained above in connection with FIGS. 4a-4e—the outer region 13 of the fiber supply caps 10, 10' is elastic. In the exemplary embodiment, the transition from the rigid inner region 16 to the elastic outer region 13 of the fiber supply cap 10 corresponds essentially to the transition from the boss 5 to the blow molded part of the liner 3 with reference to the outer surface of the pole cap 2. In other words, the rigid inner region 16 of the fiber supply cap comes to rest against the surface of the boss 5, whereas the outer region 13, through an elastic deformation at the circumferential material relief 14, adapts to the adjacent surface contour of the blow mold part of the liner 3. It is also clear from FIG. 3 that before the fiber supply 22 is uncovered, the individual plies of the reinforcing layer 9 have been applied in such a way that the reversal points 23 produced on the fiber supply cap 10 at the transition between the individual plies are shifted axially toward the liner 3 with increasing layer thickness. The fiber supply cap 10 itself ensures a predetermined distance ΔX from the pole cap 2, which largely determines the size of the fiber supply 22. By means of the fiber supply caps 10, 10', it is possible to exactly maintain and position the fiber lengths in all of the plies.

After the fiber supply caps 10, 10' have come to rest against the pole caps 2, 2', the reinforcing layer 9 in the infiltration or injection tool is impregnated with a resin (likewise not shown) in order to fill up the open spaces between the individual reinforcing fibers 8 and thus to further increase the strength of the reinforcing layer 9. Because of the internal positive pressure in the liner 3, the reinforcing layer 9 is radially compressed and as a result, has a reduced wall thickness. At the same time, this radial compression reduces the overall volume of the open spaces between the fibers 8 that must be filled by the resin. Through the hardening of the resin with the internal positive pressure in the liner 3, the shape of the compressed reinforcing layer 9 is largely retained in the unloaded pressure accumulator 1 after production is complete; it is "frozen in," so to speak. On the one hand, this achieves a savings in weight and material since less resin material is required, and on the other hand, this simultaneously ensures a greater usable storage volume with predetermined outer dimensions of the pressure accumulator 1.

The invention claimed is:

1. A method for producing a pressure accumulator, suitable for storing hydrogen in motor vehicles,
   in which first, by means of a plastic blow-molding process, a liner of the pressure accumulator is produced, which has at least one pole cap, and
   then the outside of the liner is provided with a multilayered reinforcing layer produced by means of braiding,
   wherein before the individual plies of reinforcing fibers are applied, a fiber supply cap is applied to the pole cap whose outer surface is spaced apart from a pole region of the pole cap;
   during the application of the reinforcing layer, the reinforcing fibers are placed onto a body of the liner and in the pole region, are correspondingly placed onto an outer surface of the fiber supply cap so that because of the distance between the outer surface of the fiber supply cap and the pole region of the pole cap, inner plies of the reinforcing layer composed of the reinforcing fibers are provided with a fiber supply in the pole region, wherein after the application of the reinforcing layer, the liner is inserted into a tool surrounding the reinforcing layer and is acted on with an internal positive pressure so that due to the internal positive pressure, the pressure accumulator rests against the tool having an inner surface and an immobilizing device is released after the application of the reinforcing layer and because of the internal positive pressure in the liner, the fiber supply cap is slid into the pole region and the fiber supply is thus uncovered.

2. The method according to claim 1, wherein after internal positive pressure has been applied to the liner, the reinforcing layer is impregnated with a resin, which after it hardens, freezes the reinforcing layer in an expanded state caused by the internal positive pressure.

3. The method according to claim 2, wherein the fiber supply cap in this case adapts to the outer contour of the pole cap in at least some areas.

4. The method according to claim 1, wherein individual plies of the reinforcing layer are applied in such a way that reversal points produced on the fiber supply cap at a transition between the individual plies are shifted axially toward the liner with increasing layer thickness.

5. The method according to claim 1, wherein during the application of the reinforcing layer, the fiber supply cap is immobilized by an immobilizing device, which ensures the spacing of the fiber supply cap from the pole region during this process step.

6. The method according to claim 2, wherein the resin is an epoxy resin.

7. The method according to claim 1, wherein the fiber supply cap and the pole cap together form a cavity during the application of the reinforcing layer.

8. A method for producing a pressure accumulator, suitable for storing hydrogen in motor vehicles,
   in which first, by means of a plastic blow-molding process, a liner of the pressure accumulator is produced, which has at least one pole cap, and
   then the outside of the liner is provided with a multilayered reinforcing layer produced by means of braiding,
   wherein before the reinforcing fibers are applied, a fiber supply cap is applied to the pole cap whose outer surface is spaced apart from a pole region of the pole cap; during the application of the reinforcing layer, the reinforcing fibers are placed onto a body of the liner and in the pole region, are correspondingly placed onto an outer surface of the fiber supply cap so that because of the distance between the outer surface of the fiber supply cap and the pole region of the pole cap, inner plies of the reinforcing layer composed of the reinforcing fibers are provided with a fiber supply in the pole region, and wherein the fiber supply cap and the pole cap together form a cavity during the application of the reinforcing layer, wherein during the application of the reinforcing layer, the fiber supply cap is immobilized by an immobilizing device, which ensures the spacing of the fiber supply cap from the pole region during this process step, wherein after the application of the reinforcing layer, the liner is inserted into a tool surrounding the reinforcing layer and is acted on with an internal positive pressure so that due to the internal positive pressure, the pressure accumulator rests against the tool having an inner surface and the immobilizing device is released after the application of the reinforcing layer and because of the internal positive pressure in the liner, the fiber supply cap is slid into the pole region and the fiber supply is thus uncovered.

\* \* \* \* \*